(12) United States Patent
Huth et al.

(10) Patent No.: US 12,097,668 B2
(45) Date of Patent: Sep. 24, 2024

(54) METHOD FOR MANUFACTURING A STRUCTURAL COMPONENT OF A BLADE SEGMENT FOR A ROTOR BLADE OF A WIND TURBINE

(71) Applicant: General Electric Company, Schenectady, NY (US)

(72) Inventors: Scott Jacob Huth, Greenville, SC (US); Andrew Mitchell Rodwell, Greenville, SC (US); Xu Chen, Simpsonville, SC (US); Louis Rondeau, Greenville, SC (US); Scott Iverson Shillig, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 273 days.

(21) Appl. No.: 17/312,986

(22) PCT Filed: Dec. 11, 2018

(86) PCT No.: PCT/US2018/064854
§ 371 (c)(1),
(2) Date: Jun. 11, 2021

(87) PCT Pub. No.: WO2020/122870
PCT Pub. Date: Jun. 18, 2020

(65) Prior Publication Data
US 2022/0072812 A1 Mar. 10, 2022

(51) Int. Cl.
| | | |
|---|---|---|
| *B29C 70/48* | (2006.01) | |
| *B29C 70/08* | (2006.01) | |
| *B29C 70/54* | (2006.01) | |
| *B29C 70/84* | (2006.01) | |

(Continued)

(52) U.S. Cl.
CPC ............... *B29C 70/48* (2013.01); *B29C 70/08* (2013.01); *B29C 70/543* (2013.01); *B29C 70/84* (2013.01);
(Continued)

(58) Field of Classification Search
CPC ....... B29C 70/08; B29C 70/84; B29C 70/443; B29C 70/86
(Continued)

(56) References Cited

U.S. PATENT DOCUMENTS 9,970,304 B2   5/2018   Caruso et al.
10,443,579 B2  10/2019  Tobin et al.
(Continued)

FOREIGN PATENT DOCUMENTS

| CN | 105690790 A | 6/2016 |
| EP | 3069858 A1 | 9/2016 |
| FR | 3041708 A1 | 3/2017 |

OTHER PUBLICATIONS

The English translation of the CN Search Report for CN application No. 201880100684.9, Sep. 14, 2022, 3 pages.
(Continued)

*Primary Examiner* — Emmanuel S Luk
*Assistant Examiner* — Debjani Roy
(74) *Attorney, Agent, or Firm* — Dority & Manning, P.A.

(57) ABSTRACT

A method for manufacturing a structural component of a blade segment for a segmented rotor blade of a wind turbine includes forming first and second portions of the structural component. The first and second portions include respective holes that align in a chord-wise direction. The method also includes placing the first and second portions of the structural component into a mold such that their respective holes align in the chord-wise direction. Further, the method includes placing a tooling pin through the aligned holes. In
(Continued)

addition, the method includes infusing the first and second sides together in the second mold via a resin material so as to form the structural component. Moreover, the method includes removing the tooling pin after the structural component has cured.

10 Claims, 11 Drawing Sheets

(51) Int. Cl.
 *F03D 1/06* (2006.01)
 *B29L 31/08* (2006.01)
(52) U.S. Cl.
 CPC ..... *B29L 2031/085* (2013.01); *F05B 2230/50* (2013.01); *F05B 2240/302* (2013.01)
(58) Field of Classification Search
 USPC .................................................. 416/226, 233
 See application file for complete search history.

(56) References Cited

U.S. PATENT DOCUMENTS

| | | |
|---|---|---|
| 2012/0091627 A1 | 4/2012 | Schibsbye |
| 2012/0257984 A1* | 10/2012 | Frederiksen ............ B29C 70/48 |
| | | 264/510 |
| 2013/0181374 A1 | 7/2013 | Ender |
| 2015/0097320 A1 | 4/2015 | Bauer |
| 2015/0252780 A1* | 9/2015 | Jonnalagadda ....... F03D 1/0675 |
| | | 416/226 |
| 2017/0022825 A1* | 1/2017 | Caruso ................... B29C 65/34 |

OTHER PUBLICATIONS

PCT International Search Report and Opinion Corresponding to PCT/US2018/064854 Sep. 25, 2019.

* cited by examiner

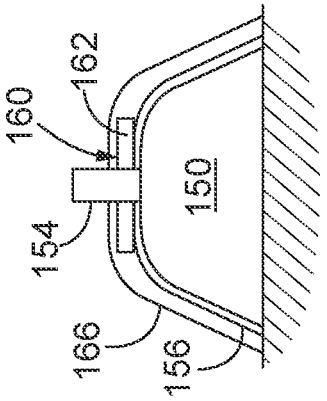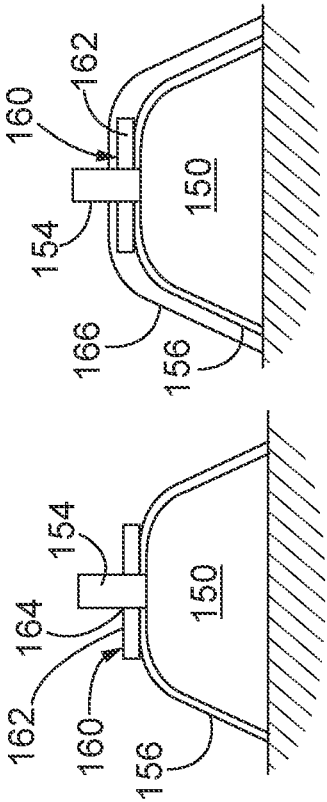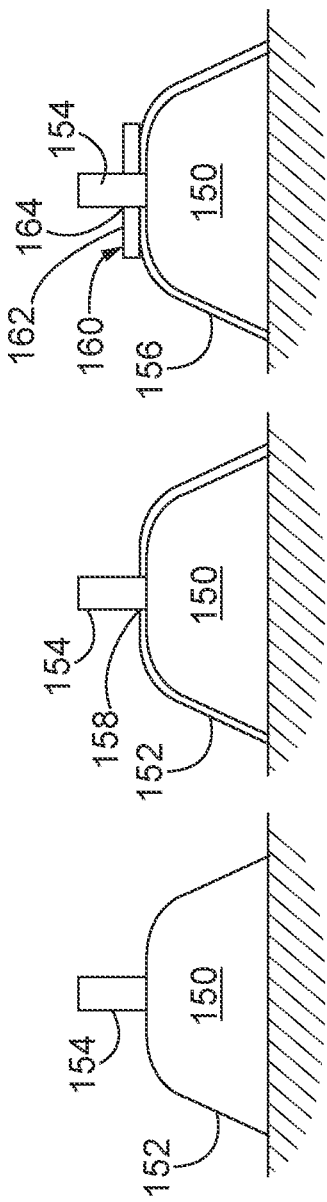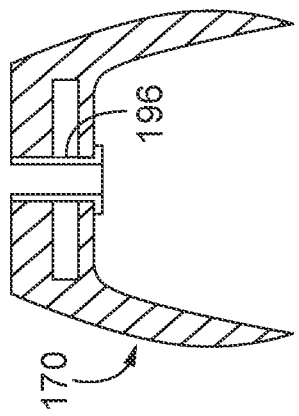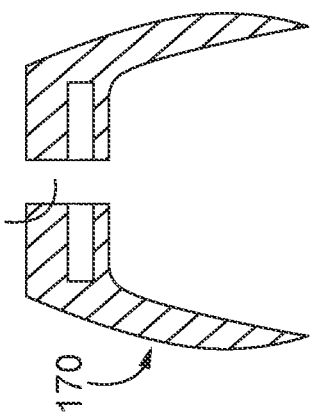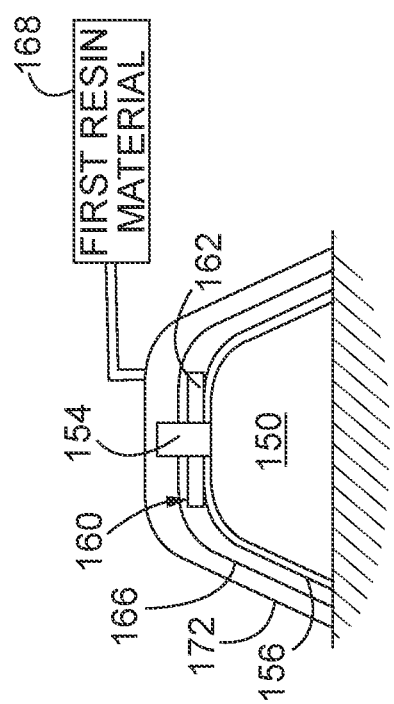

METHOD FOR MANUFACTURING A STRUCTURAL COMPONENT OF A BLADE SEGMENT FOR A ROTOR BLADE OF A WIND TURBINE

FIELD

The present disclosure relates generally to wind turbines, and more particularly to a method for manufacturing a structural component, such as a beam structure or a receiving section, of a blade segment for a segmented rotor blade of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

In addition, as wind turbines continue to increase in size, the rotor blades also continue to increase in size. As such, modern rotor blades may be constructed in segments that are joined together at one or more joints. Accordingly, certain jointed rotor blades include a first blade segment having a beam structure that is received within a receiving section of a second blade segment that is further secured together via one or more span-wise and chord-wise extending pins that transfer the blade bending moment from one segment to the other. Moreover, the reactions from the pins are transferred to various bearing blocks at the joint locations via one or more bushings.

Machining the large structural components of the blade segments can be complex. For example, in certain instances, a complex fixturing process may need to be performed to secure the beam structure and/or the receiving section in place to consistently locate the pin holes in the part. Further, an expensive, custom drilling machine is typically required to ensure that the part can be drilled in one setup without having to move the part during the drilling process. Moreover, if there is a quality issue in the drilling process, the entire structural component may be defective and unusable.

Accordingly, the present disclosure is directed to methods for manufacturing a structural component of a blade segment for a segmented rotor blade of a wind turbine that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for manufacturing a structural component of a blade segment for a segmented rotor blade of a wind turbine. The method includes (a) providing a first mold of the structural component. The first mold has an outer wall that defines at least a portion of an inner surface of the structural component. The method also includes (b) securing at least one tooling pin to the outer wall of the first mold for defining a pin joint slot in the structural component. Further, the method includes (c) laying up one or more fiber layers atop the first mold so as to at least partially cover the outer wall. The fiber layer(s) having at least one hole that fits around the tooling pin(s). Moreover, the method includes (d) infusing the fiber layer(s) together via a first resin material so as to form a first side of the structural component. In addition, the method includes (e) repeating steps (a) through (d) so as to form a second side of the structural component. The method also includes (f) placing the first and second sides into a second mold in opposite directions such that their respective holes align in a chord-wise direction. As such, the method includes (g) infusing the first and second sides together in the second mold via a second resin material.

In one embodiment, the first and second sides may correspond to a leading edge side and a trailing edge side of the structural component. In another embodiment, laying up the fiber layer(s) atop the first mold may include laying up one or more inner fiber layers atop the mold, laying up one or more structural features atop the inner fiber layer(s), and laying up one or more outer fiber layers atop the structural feature(s).

In further embodiments, the method may include placing at least one mandrel between the leading and trailing sides in the second mold so as to provide a base shape for shaping the structural component. Further, the mandrel may include a compressible or solid material having at least one hole extending therethrough that aligns with the respective holes of the leading and trailing sides. In addition, the mandrel(s) may taper outwards toward an open end of the structural component to facilitate removal thereof. In addition, the mandrel(s) may be constructed of two or more interlocking or tapered portions. More specifically, the two or more interlocking or tapered portions may include a pressure side portion, a center portion, and a suction side portion. In such embodiments, the method may include removing the center portion after infusing the first and second sides together in the second mold and subsequently removing the pressure side and suction side portions of the mandrel. In certain embodiments, the various portions of the mandrel may have a tapered cross-section in a span-wise direction of the structural component.

In additional embodiments, the method may include wrapping one or more vacuum bags around the first and second sides and the at least one mandrel within the second mold before infusing. In several embodiments, the method may also include placing structural feature(s) atop or between the fiber layer(s) and infusing the one or more outer fiber layers and the structural feature(s) together via the first resin material. More specifically, in such embodiments, the structural features may include one or more shear webs.

In additional embodiments, the method may also include placing a bushing within the respective holes of the first and second sides and securing the tooling pin(s) within the bushings. In another embodiment, the structural component may correspond to a beam structure or a receiving section of the blade segment.

In another aspect, the present disclosure is directed to a method for manufacturing a structural component of a blade segment for a segmented rotor blade of a wind turbine. The method includes providing a mold of the structural component, the mold having an outer wall that defines an outer surface of the structural component. The method also includes securing at least one tooling pin to the outer wall for defining a pin joint slot in the structural component. Further, the method includes laying up one or more outer fiber layers in the mold so as to at least partially cover the outer wall. The outer fiber layer(s) have at least one hole that receives the tooling pin(s). As such, the outer fiber layer(s) forms the outer surface of the structural component. Moreover, the method includes placing one or more structural features atop the one or more outer fiber layers in the mold. In addition, the method includes infusing the outer fiber layer(s) and the structural feature(s) together via a resin material so as to form the structural component. It should be understood that the method may further include any of the additional features and/or process steps described herein.

In yet another aspect, the present disclosure is directed to a molding kit for manufacturing a receiving section of a blade segment for a segmented rotor blade of a wind turbine. The molding kit includes a first mold for forming first and second sides of the receiving section of one or more materials. The molding kit also includes at least one tooling pin for defining respective holes in the first and second sides so as to form a pin joint slot in the receiving section during manufacturing. Further, the molding kit includes a second mold for receiving the first and second sides in opposite directions to form leading and trailing edge sides of the receiving section. In addition, the molding kit includes at least one mandrel arranged in the second mold for providing a base shape for shaping the receiving section. Further, the mandrel(s) is constructed of a compressible or solid material having a hole extending therethrough. Thus, the first and second sides of the receiving section are configured to fit around the mandrel(s) such that their respective holes align with the hole of the mandrel. Accordingly, the first and second sides can be infused together in the second mold via a resin material.

In one embodiment, the material(s) used to construct the first and second sides may include, for example, one or more outer fiber layers, one or more layers of pultrusions, one or more shear webs, and/or one or more inner fiber layers. In addition, the resin material may include a thermoset resin or a thermoplastic resin. It should be understood that the molding kit may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 8A-8G illustrate process steps for one embodiment of manufacturing first and second sides of a receiving section of a blade segment for a segmented rotor blade of a wind turbine according to the present disclosure;

DETAILED DESCRIPTION

Figure 1:
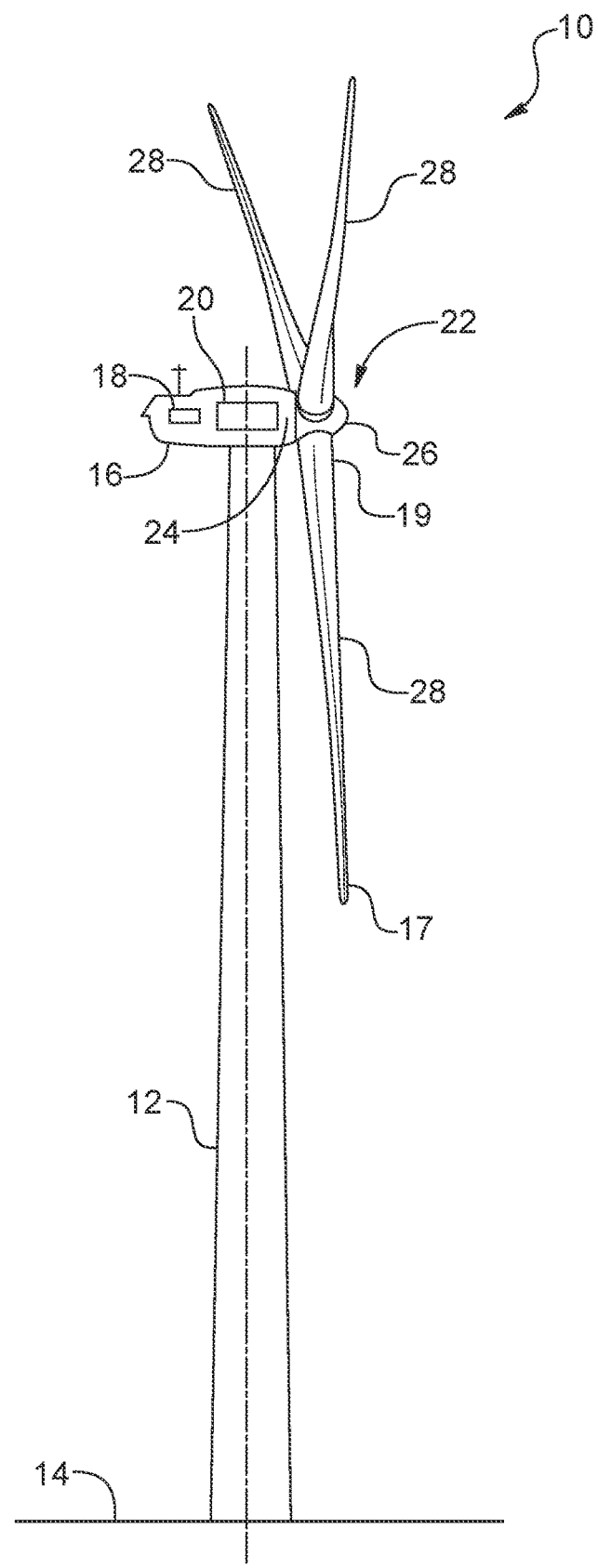
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
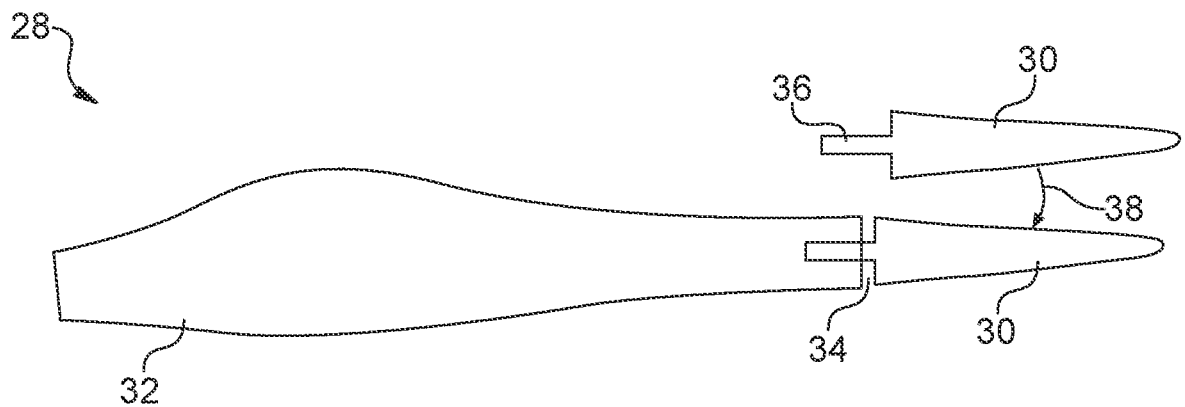
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member defining an airfoil surface, such as a pressure side shell member and a suction side shell member. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32. In addition, as shown, the second blade segment includes multiple spar structures 66 (also referred to herein as spar caps) that extend lengthwise for connecting with the beam structure 40 of the first blade segment 30 (which is shown in more detail in FIGS. 3 and 5).

Figure 3:
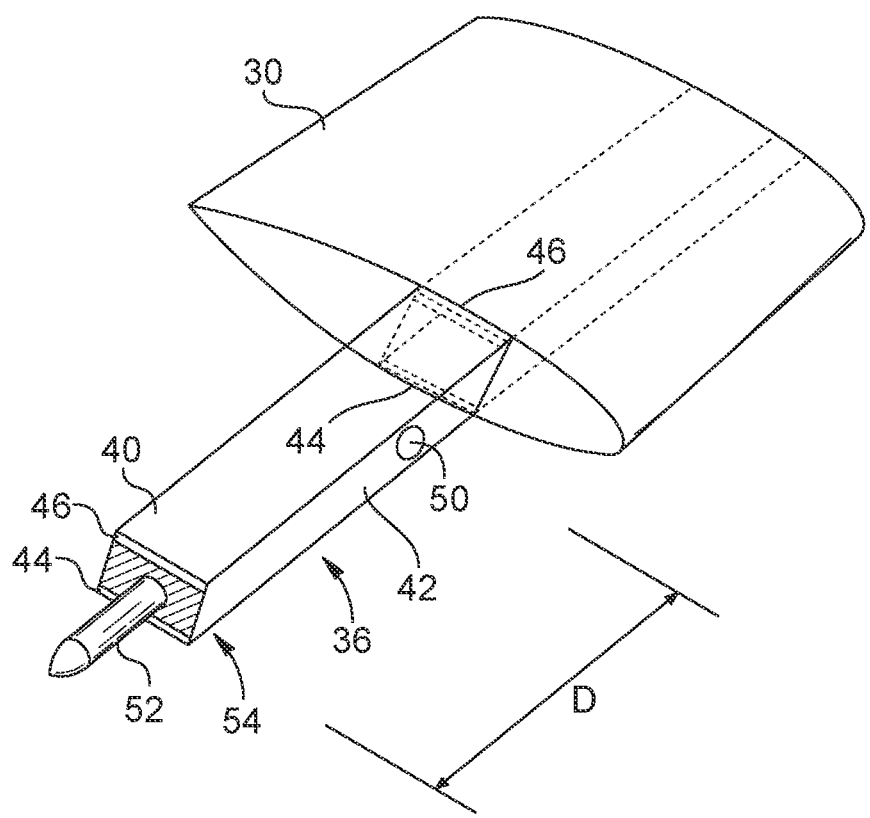
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms at least a part of a shear web 42 connected with a suction side spar cap 44 and a pressure side spar cap 46. Moreover, as shown, the first blade segment 30 may include one or more first pin joints at a receiving end 54 of the beam structure 40. In one embodiment, the pin joint may include a pin that is in a tight interference fit with a bushing. More specifically, as shown, the pin joint(s) may include at least one pin tube 52 located on the receiving end 54 of the beam structure 40. Thus, as shown, the pin tube 52 may be oriented in a span-wise direction. Further, the first blade segment 30 may also include a pin joint slot 50 located on the beam structure 40. Moreover, as shown, the pin joint slot 50 may be oriented in a chord-wise direction.

Figure 4:
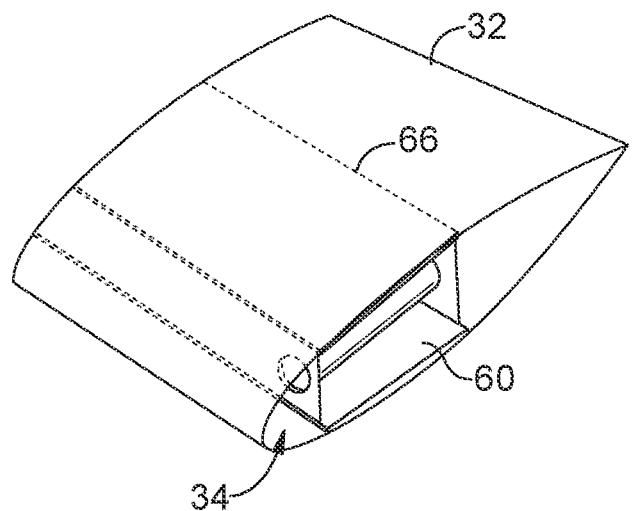
FIG. 4 illustrates a perspective view of one embodiment of a section of the second blade segment at the chord-wise joint according to the present disclosure.

Referring now to FIG. 4, a perspective view of a section of the second blade segment 32 according to the present disclosure is illustrated. As shown, the second blade segment 32 includes a receiving section 60 extending lengthwise within the second blade segment 32 for receiving the beam structure 40 of the first blade segment 30. Further, as shown, the receiving section 60 may include the spar structures 66 that extend lengthwise for connecting with the beam structure 40 of the first blade segment 30. In addition, as shown, the receiving section 60 may include a chord-wise member 48 having a span-wise pin joint slot 56 defined therethrough. Moreover, as shown, the receiving section 60 may include a chord-wise pin joint slot 58 defined therethrough that aligns with the pin joint slot 50 of the beam structure 40.

Figure 5:
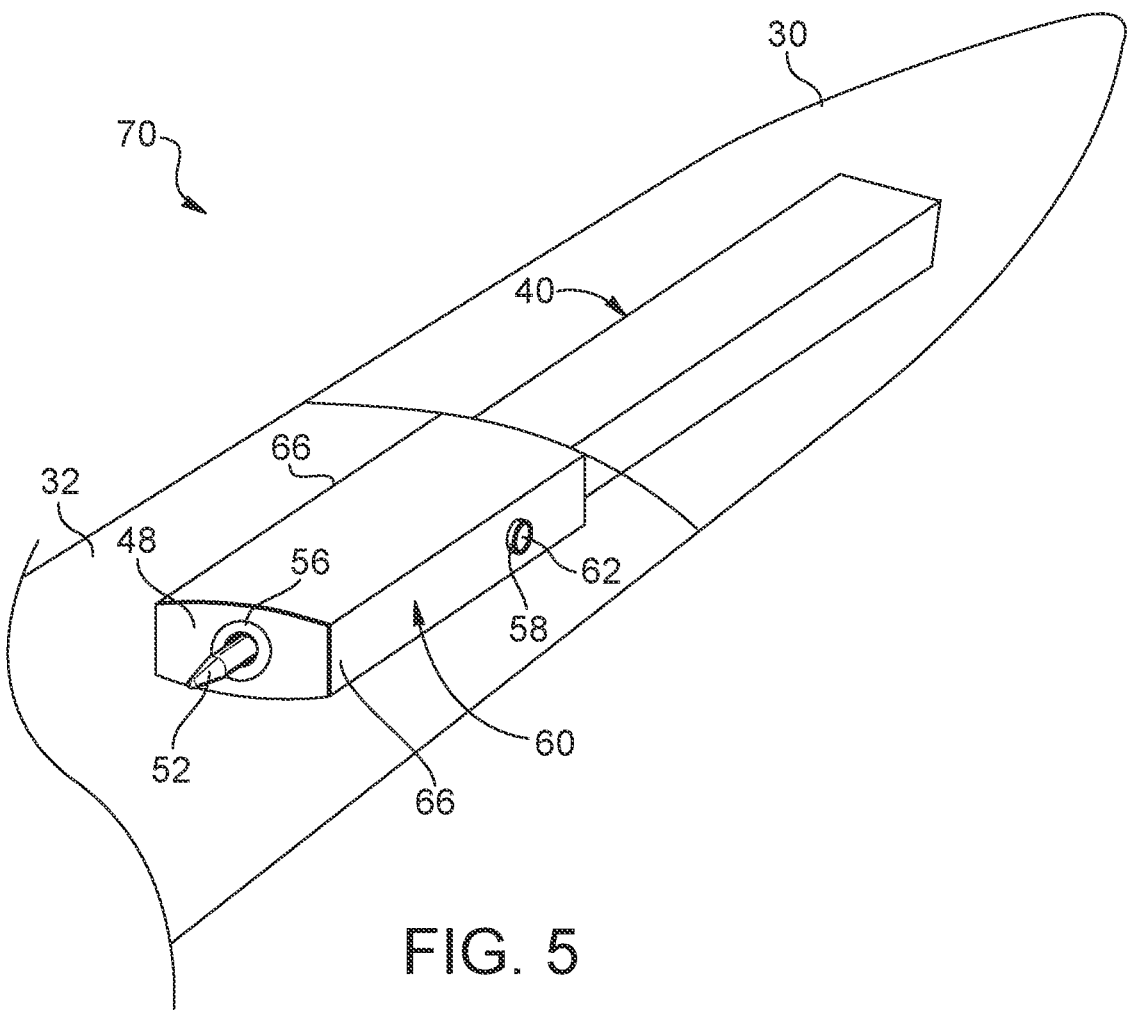
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. More specifically, as shown, the span-wise extending pin 52 of the receiving end 54 of the beam structure 40 is received within the span-wise pin joint slot 56 of the receiving section 60 so as to secure the first and second blade segments 30, 32 together.

Figure 6:
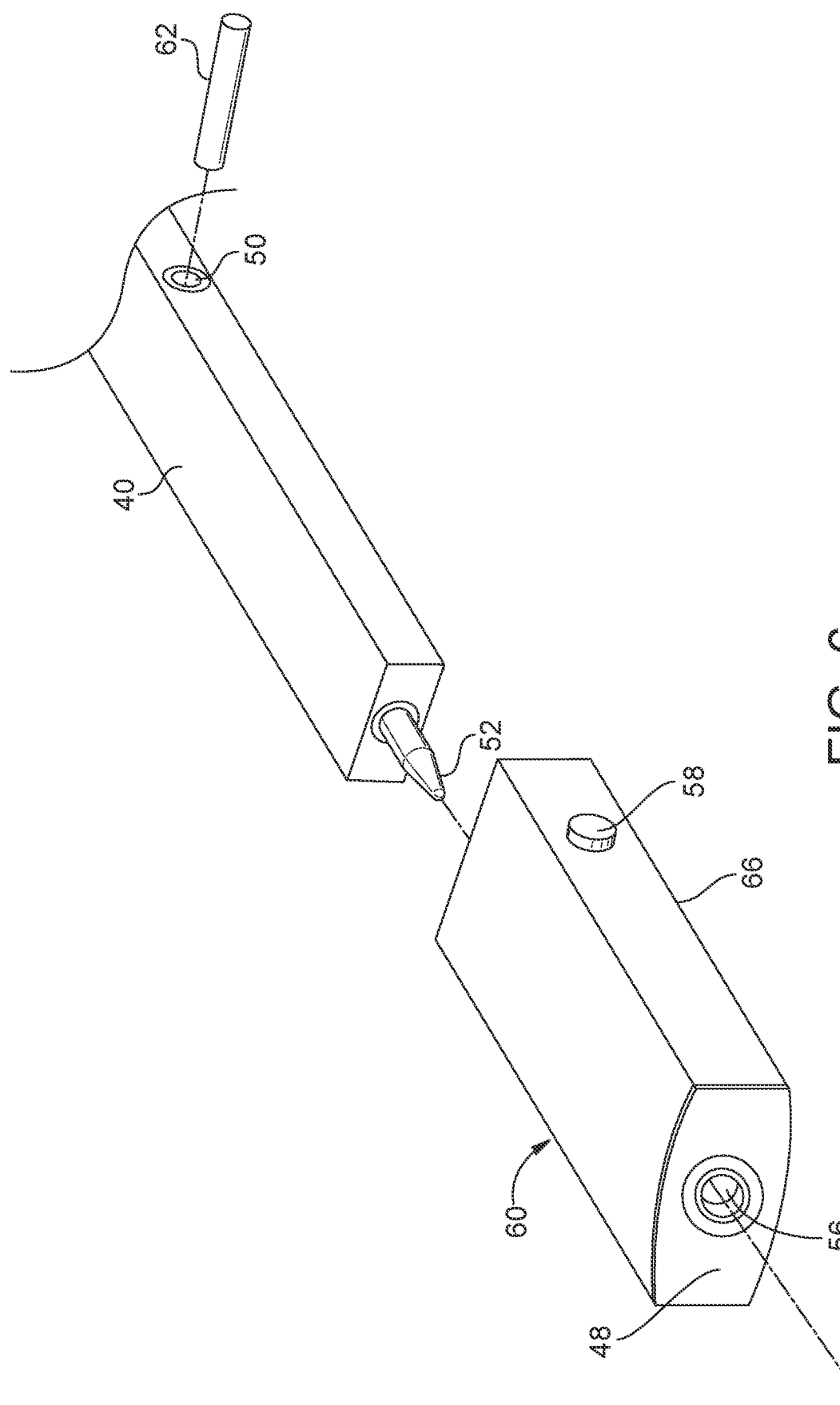
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, the spar structures 66 are configured to receive the beam structure 40 and may include the chord-wise pin joint slot 58 that align with the pin joint slot 50 of the beam structure 40 through which a chord-wise extending pin 62 may be inserted. Further, as shown, the chord-wise extending 62 may be configured to remain in a tight interference fit within the aligning pin joint slots 50, 58 such that spar structures 66 and the beam structure 40 are joined together during assembly. Further, FIG. 6 also illustrates the chord-wise member 48 that includes the pin joint slot 56 configured for receiving the pin tube 52 (also referred to herein as the span-wise extending pin 52) of the beam structure 40. As such, the pin tube 52 is configured to form a tight interference fit pined joint.

Figure 7:
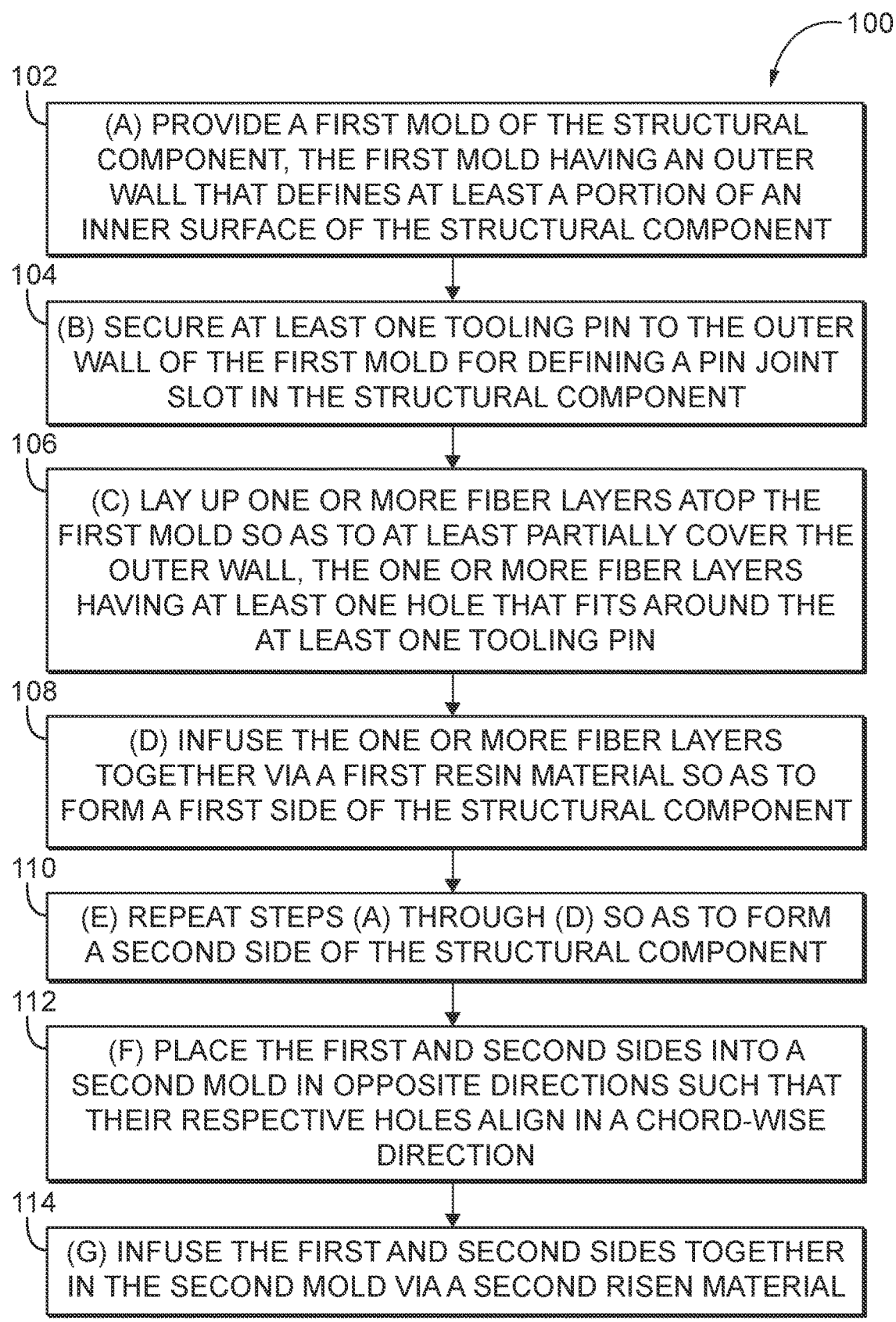
FIG. 7 illustrates a flow chart of one embodiment of a method for manufacturing a receiving section of a blade segment for a segmented rotor blade of a wind turbine according to the present disclosure.

Referring now to FIG. 7, a flow chart 100 of a method for manufacturing a structural component, such as a beam structure or a receiving section, of a blade segment for a segmented rotor blade of a wind turbine according to the present disclosure is illustrated. In general, the method 100 will be described herein with reference to the receiving section 60 of the rotor blade 28 shown in FIGS. 1-6, 8-9, and 10-11. However, it should be appreciated that the disclosed method 100 may be implemented with rotor blades having any other suitable configurations. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include (a) providing a first mold of the receiving section 60. For example, as shown in FIG. 8A, the first mold 150 may define an outer wall 152 that defines at least a portion of an inner surface of the receiving section 60 once formed. Further, as shown at (104), the method 100 may include (b) securing at least one tooling pin 154 to the outer wall 152 of the first mold 150 for defining a pin joint slot in the receiving section 60. For example, as shown in FIG. 8A, the tooling pin 154 may be secured atop the outer wall 152 of the first mold 150. As shown at (106), the method 100 may include (c) laying up one or more fiber layers 156, 166 atop the first mold 150 so as to at least partially cover the outer wall 152. More specifically, as shown in FIG. 8B, one or more inner fiber layer(s) 156 may be placed atop the first mold 150. Further, as shown, the inner fiber layer(s) 156 may have at least one hole 158 that fits around the tooling pin 154. In further embodiments, as shown FIG. 8C, the method 100 may also include placing structural feature(s) 160 atop the inner fiber layer(s) 156. More specifically, as shown, the structural features 160 may include one or more shear webs 162 having at least one hole 164 configured therein to fit around the tooling pin 154. In addition, as shown in FIG. 8D, the method 100 may include placing one or more outer fiber layer(s) 166 atop the structural feature(s) 160.

Accordingly, referring back to FIG. 7, as shown at (108), the method 100 may further include (d) infusing the one or more fiber layers 156, 166 together via a first resin material 168 so as to form a first side 170 of the receiving section 60. For example, as shown in FIG. 8E, a vacuum bag 172 and associated consumables may be placed atop the first mold 150, the fiber layers 156, 166, and the structural feature(s) 160 such that the first resin material 168 may vacuum infuse such components together. As shown in FIG. 8F, a front view of one embodiment of the final first side 170 of the receiving section 60 is illustrated, particularly illustrating the first side 170 having a hole 174 formed therein, which makes up part of the pin joint slot 58 described herein.

Referring back to FIG. 7, as shown at (110), the method 100 may further include (e) repeating steps (a) through (d) so as to form a second side 176 of the receiving section 60. As such, the first and second sides 170, 176 are substantially identical components and are configured to form leading edge and trailing edge sides of the receiving section 60, respectively. In additional embodiments, as shown in FIG. 8G, the method 100 may also include placing a bushing 196 within the respective holes 174, 178 of the first and second sides 170, 176 and securing the tooling pin(s) 154 within the bushings 196.

Figure 9A:
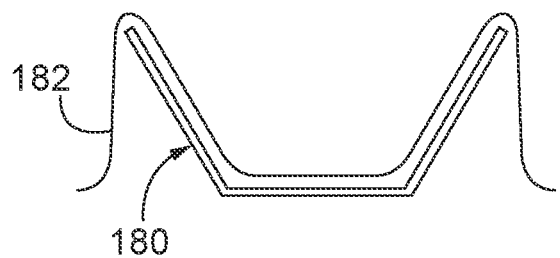
FIGS. 9A-9F illustrate process steps for one embodiment of manufacturing a receiving section of a blade segment for a segmented rotor blade of a wind turbine according to the present disclosure.
Figure 9B:
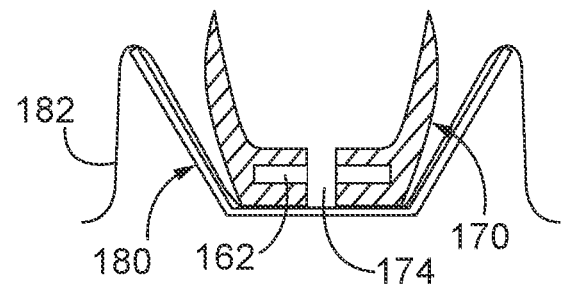
Figure 9C:
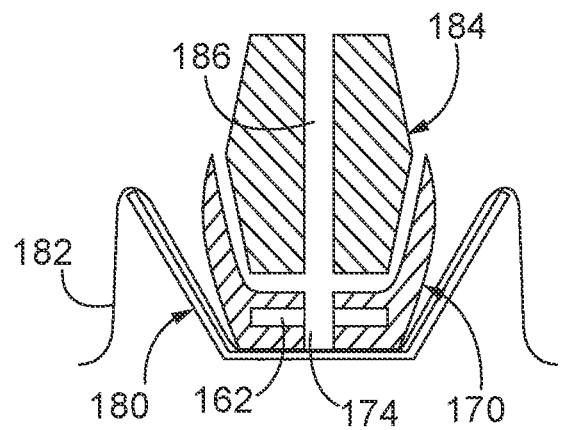
Figure 9D:
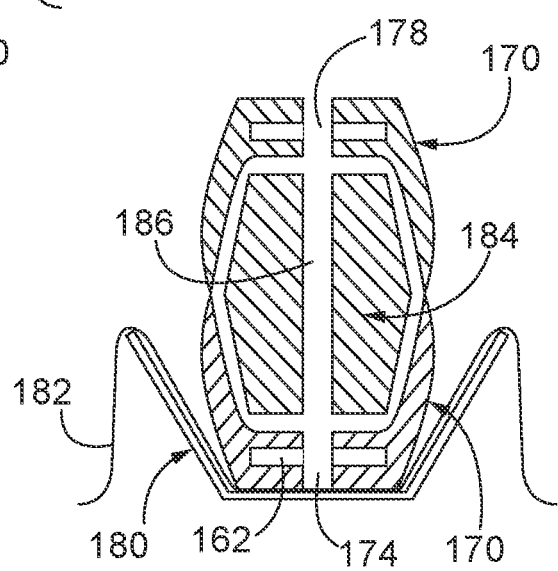

Thus, as shown at (112), the method 100 may include (f) placing the first and second sides 170, 176 into a second mold 180 in opposite directions such that their respective holes 174, 178 align in a chord-wise direction. More specifically, as shown in FIG. 9A, a vacuum bag 182 and associated consumables may be first placed into the second mold 180. As shown in 9B, the first side 170 may then be placed atop the vacuum bag 182. As shown in FIG. 9C, the method 100 may then include placing at least one mandrel 184 atop the first side 170 of the receiving section 60. Thus, as shown, the mandrel(s) 184 is configured to provide a base shape for shaping the receiving section 60.

Figure 10:
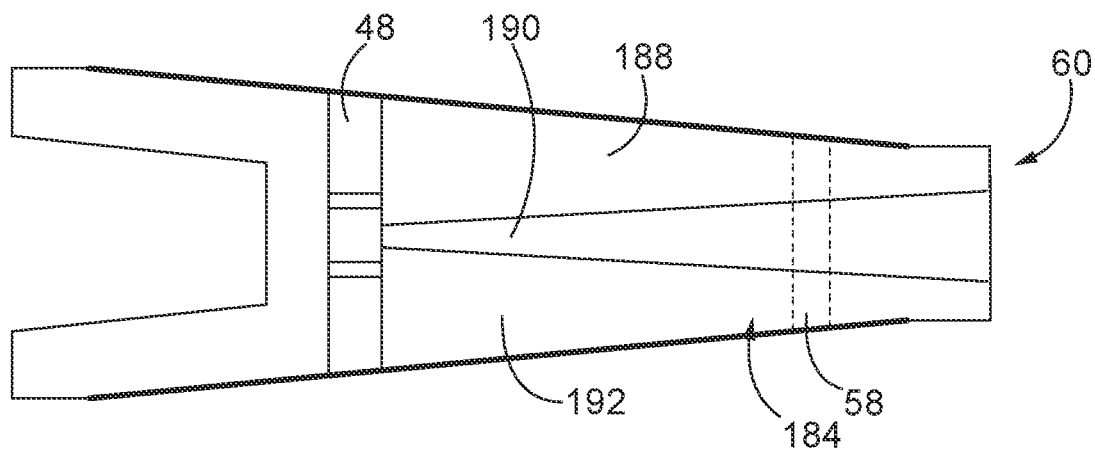
FIG. 10 illustrates a span-wise view of one embodiment of a receiving section of a blade segment for a segmented rotor blade of a wind turbine according to the present disclosure, particularly illustrating a three-piece mandrel configured within the receiving section during manufacturing thereof.
Figure 11:
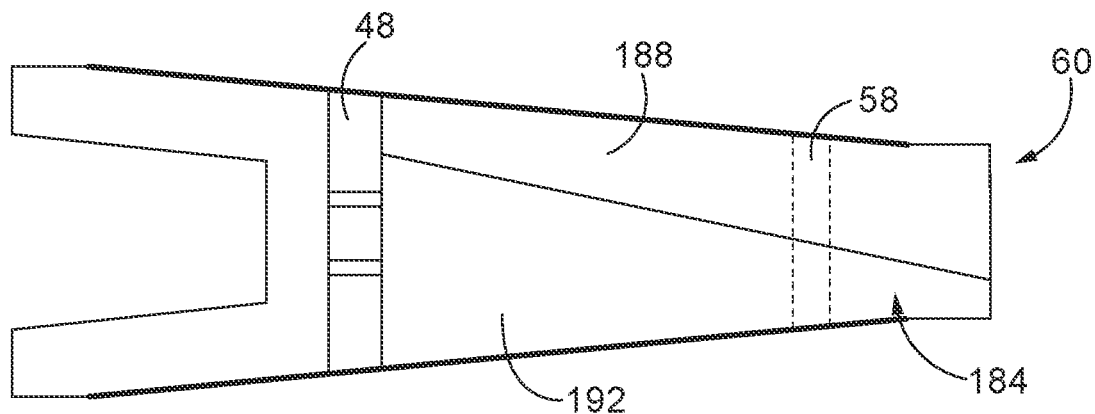
FIG. 11 illustrates a span-wise view of another embodiment of a receiving section of a blade segment for a segmented rotor blade of a wind turbine according to the present disclosure, particularly illustrating a two-piece mandrel configured within the receiving section during manufacturing thereof.

Further, the mandrel 184 may be constructed of a compressible or solid material having at least one hole 186 extending therethrough that aligns with the respective holes 158, 164 of the leading and trailing sides 170, 176. In addition, as shown in FIGS. 10 and 11, the mandrel(s) 184 described herein may be constructed of multiple portions or parts. For example, as shown in FIG. 10, the mandrel(s) 184 may include a pressure side portion 188, a center portion 190, and a suction side portion 192. In another embodiment, as shown in FIG. 11, the mandrel(s) 184 may have a two-part configuration that simply includes the pressure side portion 188 and the suction side portion 192. In addition, as shown in FIGS. 10 and 11, the various portions 188, 190, 192 of the mandrel 184 may have a tapered cross-section in a span-wise direction of the receiving section 60.

Figure 9E:
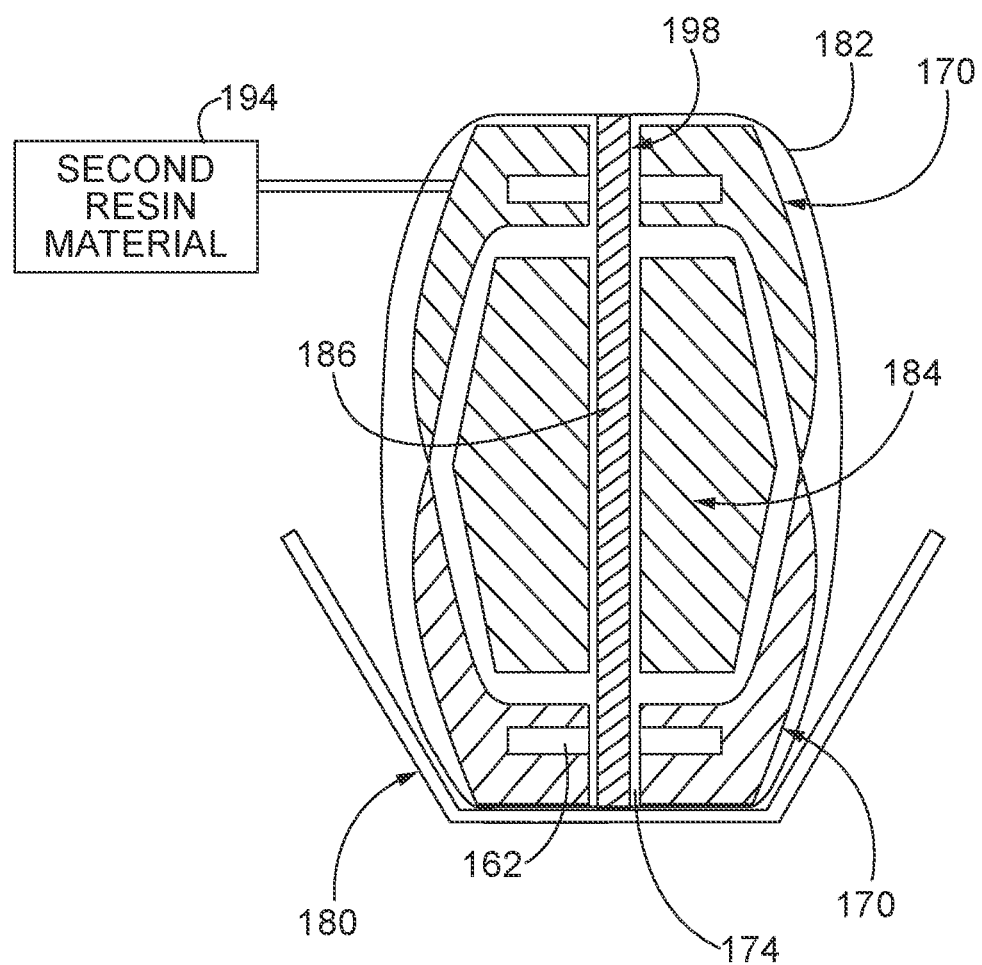
Figure 9F:
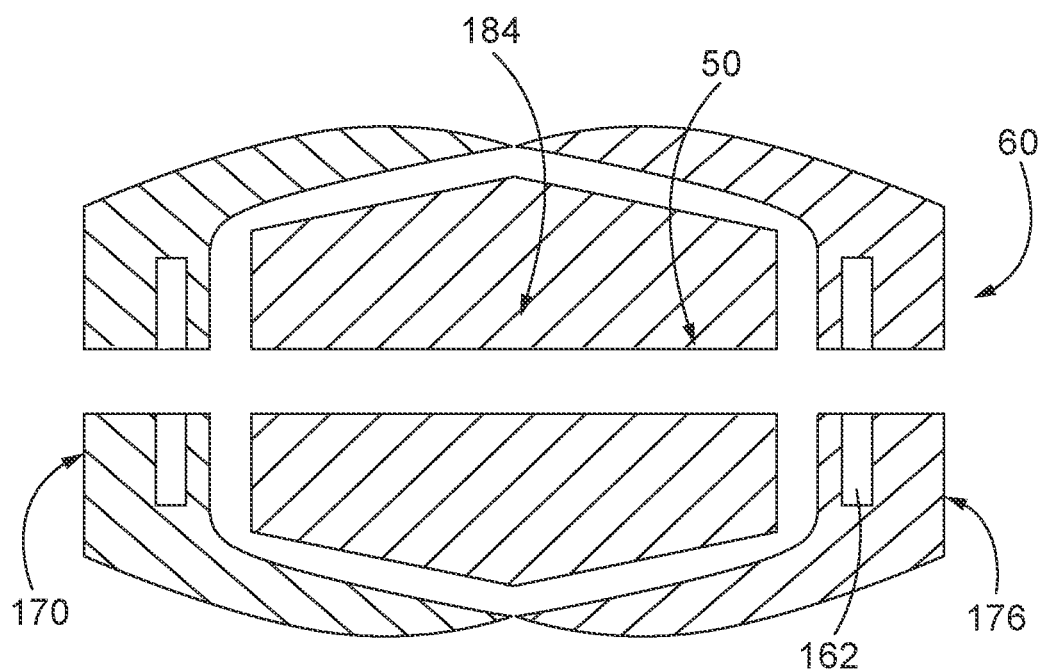

Referring back to FIG. 9D, after placing the mandrel 184, the second side 176 of the receiving section 60 may be placed atop the mandrel 184. As shown, the second side of the receiving section 60 also includes hole 178 that aligns with the hole 174 of the first side 170 and the hole 186 of the mandrel 184. Thus, as shown in FIG. 9E, another tooling pin 198 may be inserted through the aligned holes 174, 178, 186. In addition, as shown, the vacuum bag 182 can then be wrapped around the first and second sides 170, 176 and the mandrel 184. Thus, referring back to FIG. 7, as shown at (114), the method 100 may include (g) infusing the first and second sides 170, 176 together in the second mold 180 via a second resin material 194. A cross-sectional view of the final receiving section is illustrated in FIG. 9F, particularly illustrating the pre-formed pin joint slot 58 formed therein.

Further, as shown, the illustrated receiving section 60 still includes the mandrel 184. Therefore, in such embodiments, the method 100 may also include removing the mandrel 184 from within the receiving section 60. For example, where a three-part mandrel is used (FIG. 10), the center portion 190 of the mandrel 184 can be extracted first, i.e. through one of the open ends of the receiving section 60 after the part has cured. As such, when the center portion 190 of the mandrel 184 is removed, the pressure and suction side portions 188, 192 of the mandrel 184 come together such that they can also be easily removed from within the receiving section 60 via one of the open ends thereof. Where a two-part mandrel 184 is used (FIG. 11), of the pressure or suction side portions 188, 192 are removed through one of the open ends followed by the other. In addition, the tapered cross-sections of the various portions 188, 190, 192 of the mandrel 184 are also configured to further assist in extracting the part. In addition, as mentioned, the mandrel 184 may be compressible; therefore, it may include air that can be removed via the same vacuum system used to infuse the structural component together. As such, once the mandrel 184 is deflated, it can be easily removed from a tip end of the finished receiving section. The mandrel 184 may also be formed of a foam material or the like that can be easily compressed to allow for ease of removal.

Figure 12:
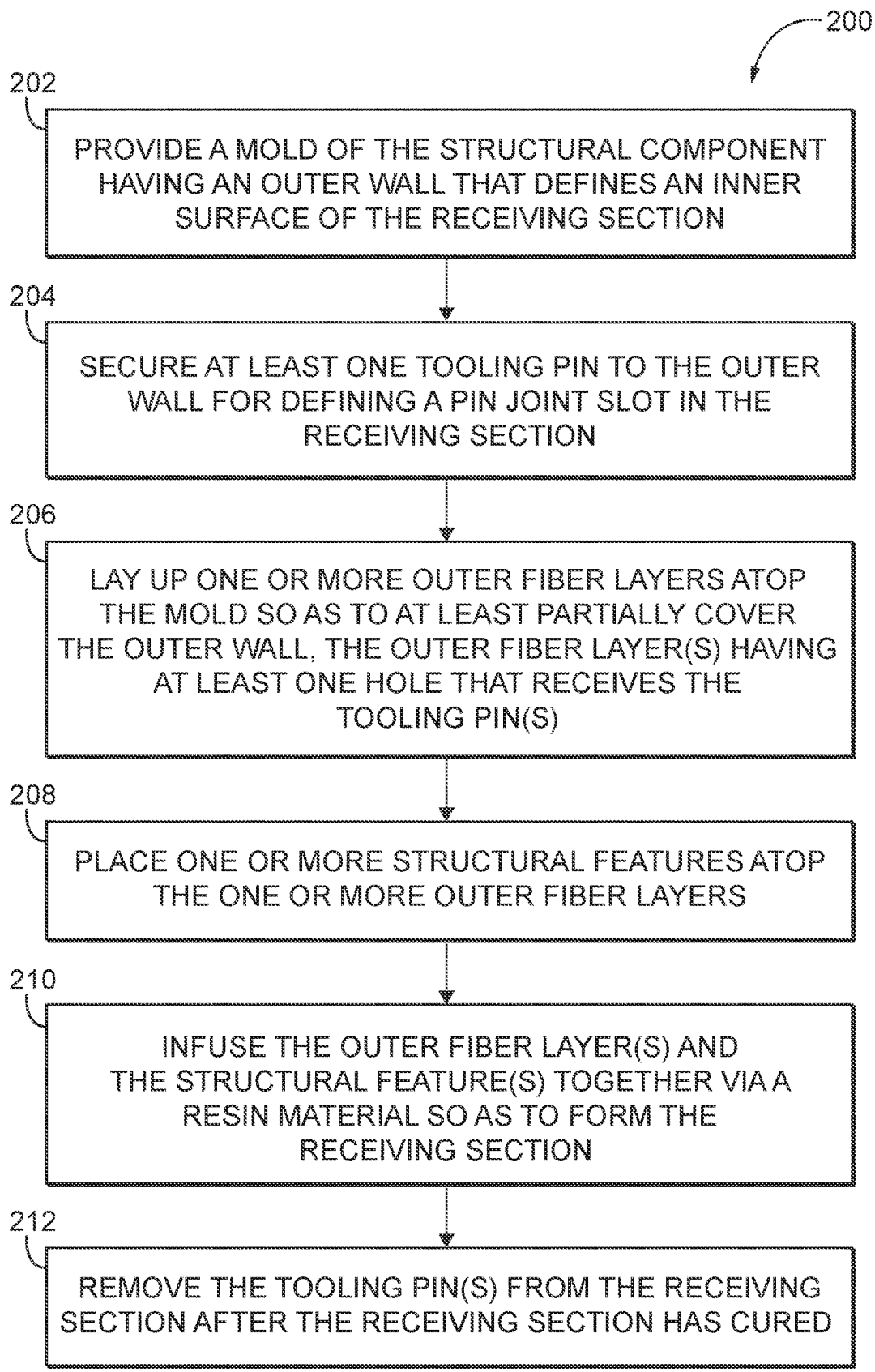
FIG. 12 illustrates a flow chart of another embodiment of a method for manufacturing a receiving section of a blade segment for a segmented rotor blade of a wind turbine according to the present disclosure.

Referring now to FIG. 12, a flow chart 200 of a method for manufacturing a structural component, such as a beam structure or a receiving section, of a blade segment for a segmented rotor blade of a wind turbine according to the present disclosure is illustrated. In general, the method 200 will be described herein with reference to the receiving section 60 of the rotor blade 28 shown in FIGS. 1-6, 8-9, and 10-11. However, it should be appreciated that the disclosed method 100 may be implemented with rotor blades having any other suitable configurations. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include providing a mold of the structural component having an outer wall that defines an inner surface of the receiving section 60. As shown at (204), the method 200 may include securing at least one tooling pin to the outer wall for defining a pin joint slot in the receiving section 60. As shown at (206), the method 200 may include laying up one or more outer fiber layers atop the mold so as to at least partially cover the outer wall. The outer fiber layer(s) have at least one hole that receives the tooling pin(s). As such, the outer fiber layer(s) forms the inner surface of the receiving section 60. As shown at (208), the method 200 may include placing one or more structural features atop the one or more outer fiber layers atop the mold. As shown at (210), the method 200 may include infusing the outer fiber layer(s) and the structural feature(s) together via a resin material so as to form the receiving section 60. As shown at (212), the method 200 may include removing tooling pin(s) from the receiving section 60 after the receiving section 60 has cured.

The resin material 168, 194 described herein may include, for example, a thermoset material or a thermoplastic material. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethylmethyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, the fiber layers described herein may include, for example, glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a structural component of a blade segment for a segmented rotor blade of a wind turbine, the method comprising:
   (a) providing a first mold of the structural component, the first mold having an outer wall that defines at least a portion of an inner surface of the structural component;
   (b) securing an end of at least one tooling pin atop the outermost surface of the outer wall of the first mold for defining a pin joint slot in the structural component;
   (c) laying up one or more fiber layers atop the first mold so as to at least partially cover the outer wall, the one or more fiber layers having at least one hole that fits around the at least one tooling pin;
   (d) infusing the one or more fiber layers together via a first resin material so as to form a first side of the structural component; and,
   (e) repeating steps (a) through (d) so as to form a second side of the structural component;
   (f) placing the first and second sides into a second mold in opposite directions such that their respective holes align in a chord-wise direction to provide a through hole extending through both the first and second sides that aligns with the respective holes of the first and second sides; and,
   (g) infusing the first and second sides together in the second mold via a second resin material wherein the first and second sides correspond to a leading edge side and a trailing edge side of the structural component further comprising placing at least one mandrel between the leading and trailing sides in the second mold so as to provide a base shape for shaping the structural component, the mandrel comprising at least one hole extending therethrough that aligns with the respective holes of the leading and trailing sides.

2. The method of claim 1, wherein laying up one or more fiber layers atop the first mold further comprises laying up one or more inner fiber layers atop the mold, laying up one or more structural features atop the one or more inner fiber layers, and laying up one or more outer fiber layers atop the one or more structural features.

3. The method of claim 1, further comprising placing one or more structural features atop or between the one or more fiber layers and infusing the one or more outer fiber layers and the one or more structural features together via the first resin material.

4. The method of claim 1, further comprising placing a bushing within the respective holes of the first and second sides and securing the at least one tooling pin within the bushings.

5. The method of claim 1, wherein the structural component comprises at least one of a beam structure or a receiving section of the blade segment.

6. The method of claim 1, wherein the at least one mandrel is tapered outwards toward an open end of the structural component to facilitate removal thereof.

7. The method of claim 1, further comprising wrapping one or more vacuum bags around the first and second sides and the at least one mandrel within the second mold before infusing.

8. The method of claim 6, wherein the at least one mandrel is constructed of two or more interlocking or tapered portions.

9. The method of claim 8, wherein the two or more interlocking or tapered portions comprise a pressure side portion, a center portion, and a suction side portion, the method further comprising:
   removing the center portion after infusing the first and second sides together in the second mold; and,
   subsequently removing the pressure side and suction side portions.

10. The method of claim 3, wherein the one or more structural features comprise one or more shear webs.

* * * * *